361-261. OR RE9,709 SR CE SEARCH
BEST AVAILABLE COPY
S. GARDINER, Jr., dec'd,
E. N. DICKERSON, JR., assignee.
Lighting Gas by Electricity.
RE No. 9,709. Reissued May 17, 1881.
Figure 1.
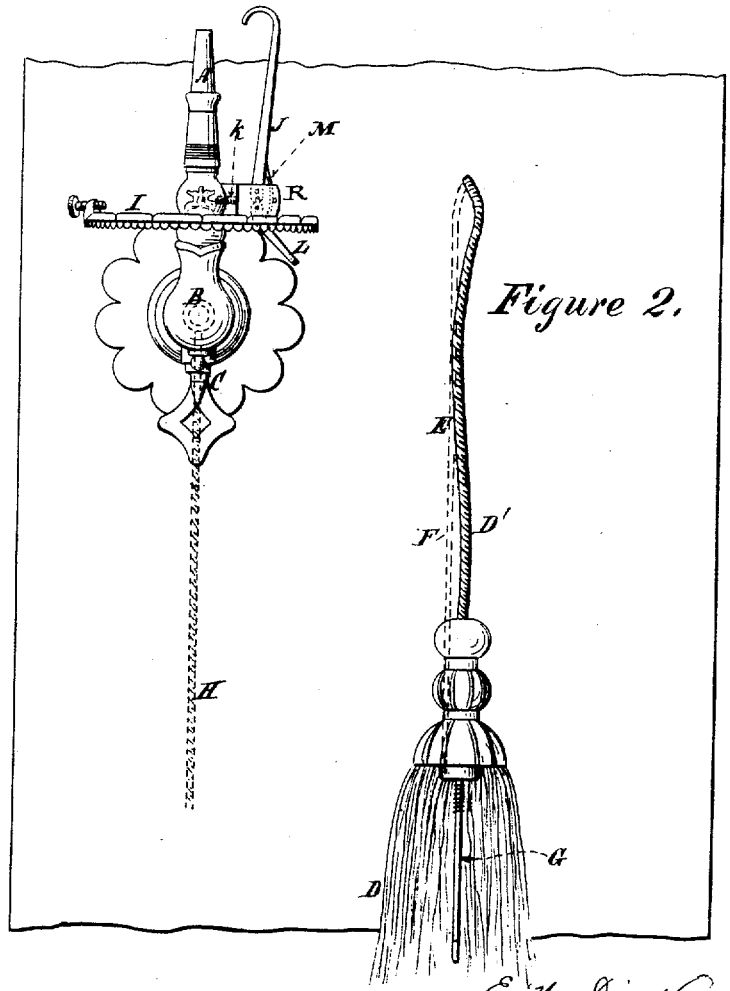
Figure 3.
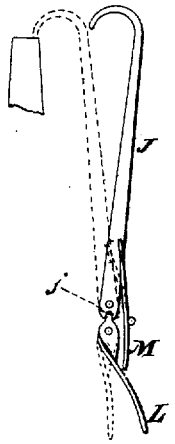
Figure 2.
Witnesses:
F. O. McCleary
A. Hanomann.
E. N. Dickerson Jr.
assignee of
Saml. Gardiner Jr. deceased.
Inventor:
By his Attorney
Charles E. Foster.
N. PETERS, Photo-Lithographer, Washington, D. C.

UNITED STATES PATENT OFFICE.

EDWARD N. DICKERSON, JR., OF NEW YORK, N. Y., ASSIGNEE, BY MESNE ASSIGNMENTS, OF SAMUEL GARDINER, JR., DECEASED.

LIGHTING GAS BY ELECTRICITY.

SPECIFICATION forming part of Reissued Letters Patent No. 9,709, dated May 17, 1881.

Original No. 55,641, dated June 19, 1866. Application for reissue filed February 7, 1881.

*To all whom it may concern:*

Be it known that SAMUEL GARDINER, Jr., late of the city of Washington, in the District of Columbia, invented a new and useful Improvement in Lighting Gas by Electricity, and declared the following to be a full, clear, and exact description of the nature, construction, and operation of the same, sufficient to enable one skilled in the art to which it appertains to fully understand and use the same, reference being had to the accompanying drawings, which are made a part of this specification, and which represent a front view of a gas bracket or burner with his invention applied.

This invention relates to a novel device for lighting single burners; and it consists of a suspended tassel connected to a source of continuous electric supply as one of the poles of a galvanic battery, and adapted to apply the electrical spark either directly to the burner or through the medium of a pivoted igniter or finger, and in mechanism for applying the electric spark to the upper part of the burner for the purpose of igniting the outflowing gas.

I shall now proceed to describe the device in connection with the drawings, in which—

Figure 1 is an external view, showing a gas-burner and attachments; Fig. 2, the conducting-wire and attachments, and Fig. 3 a detached view of the igniting devices.

A may represent a gas-burner supported upon an ordinary bracket and communicating with the gas-pipe B.

C is the cock for turning on and off the gas.

D is a tassel suspended in suitable proximity with the burner by a cord, D′, around which is coiled a flexible conducting-wire, E, which is connected to a wire, F, constituting one of the poles of a galvanic battery.

G is a stiff piece of wire suspended within the tassel and attached to the flexible conducting-coil E. The stiff wire G is pointed with platina.

H is a wire connected to the gas-pipe B and constituting the other pole of the galvanic battery.

The devices thus far described embrace the first part of the invention, and the operation will be readily understood. To light the gas it is, as usual, turned on by means of the cock C, and then the tassel D is taken in the hand, and by it the stiff wire G is placed in contact with the burner and close to the orifice where the gas is emitted. In this way the poles E and H are brought into connection, the electric current is formed, a spark given off at the extremity of the stiff wire G, and the escaping gas is lighted.

It is the intention to employ this device in connection with single burners, of whatever character they may be, and I contemplate such modifications as may conduce to the simplification or ornamentation of the contrivance.

When a globe or shade is employed in connection with the burner such globe or shade is supported upon a globe-holder, I, of common construction, which may be supported upon the bracket in any suitable manner.

To afford means for readily applying the electric spark to the burner, I employ an igniting metallic finger, J, armed at one extremity with platina, and near its other end pivoted to a non-conducting or hard-rubber stud, R, which, by means of the screw *k*, is fastened to the socket of the burner A.

L is a small finger-lever, which is also pivoted within the non-conducting stud R, and has its extremity fitted within a corresponding notch, *j*, in the end of the igniter J. The lever L projects below or outside of the globe and globe-holder, so that it may be pressed upon by the stiff wire G, appended to the tassel D. By pressing this lever inward the bent extremity of the igniter J will be thrown in contact with the burner and over the escape-orifice of the gas. When the stiff wire G, lever L, and igniter J are thus brought together or in mutual contact, and in contact with the burner, the electric circuit is formed, a spark given off, and the gas lighted, as before. The igniter having been applied to the burner and the gas lighted, a small spring, M, fixed in the stud R, retracts the igniter, or, in other words, moves it out of contact with the burner. The non-conducting stud R preserves the circuit intact until it is made available at the burner.

I do not limit myself to the employment of a cord and tassel for carrying the current to the movable conductor; but its substantial equivalent might be employed in various ways, and I desire it to be understood that the invention is not limited to this specific way of carrying the electric current to the burner, but is intended to embrace analogous contrivances.

Having thus described the invention, the following is what I claim as new herein and desire to secure by Letters Patent:

1. A gas-lighting device consisting of a burner in connection with one pole of a battery and a device insulated from and secured upon the burner, capable of a limited movement to and from the end of the same, and adapted to be brought into connection with the other pole of the battery and into contact with and moved from the end of the burner by the operator, substantially as set forth.

2. In an electric hand-lighter, the combination of a burner, a vibrating electrode, and mechanism for moving it toward the burner and in contact with its point in such a position as to ignite the gas, and a spring for withdrawing the same from its contact when released by the operator, substantially as described.

3. In an electric hand-lighter, the combination of a burner, a pivoted vibrating electrode, and mechanism for moving it toward the burner and in contact with a part thereof in such a position as to ignite the gas, and a spring for withdrawing the same from its contact when released by the operator, substantially as described.

4. In an electric hand-lighter, the combination of a burner, a pivoted vibrating electrode constructed to be brought in contact with its point, and an arm adapted to be moved by the operator and connected with the vibrating electrode in order to move it about its pivot and in contact with the point of the burner, substantially as described.

5. The combination of a burner provided with a fixed electrode and a movable electrode adapted to be brought in contact with the fixed electrode, and to be operated in one direction by the hand of the operator and in the opposite direction by a spring, substantially as set forth.

E. N. DICKERSON, Jr.

Witnesses:
Geo. H. Evans,
S. F. Sullivan.